Aug. 8, 1967
H. D. BARNHART ETAL
3,335,258
APPARATUS RESPONSIVE TO ELECTRICAL ENERGY
SUPPLIED DURING A WELDING OPERATION
Filed Oct. 9, 1963
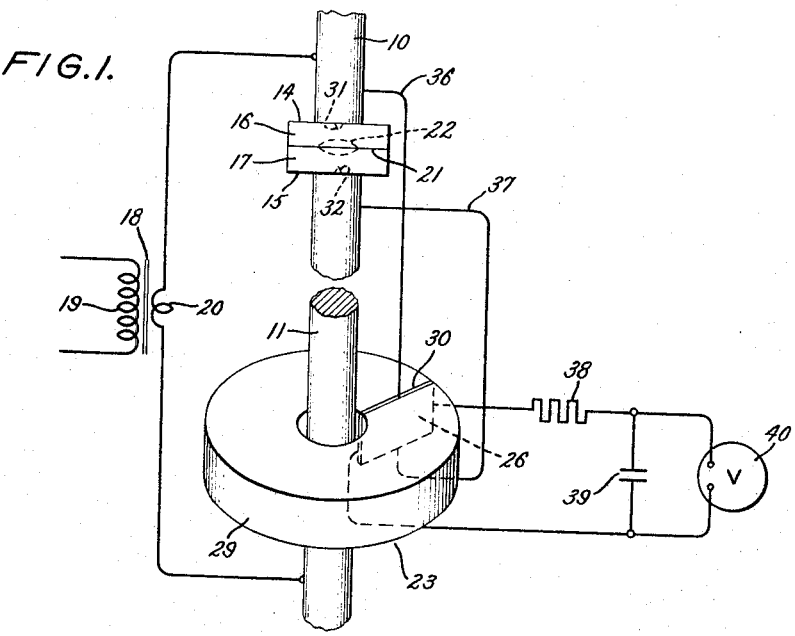
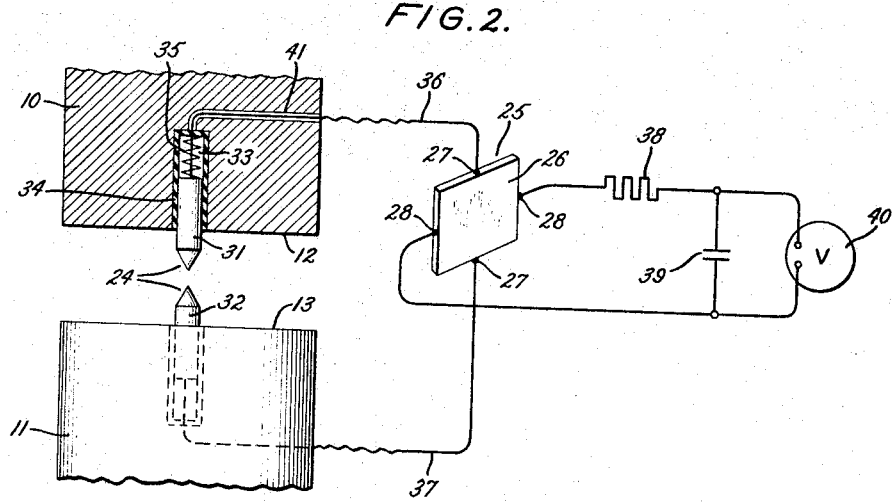
INVENTORS:
HERBERT D. BARNHART,
DONALD A. STRATTON,
BY David M. Schiller
ATTORNEY.

United States Patent Office 3,335,258
Patented Aug. 8, 1967

3,335,258
APPARATUS RESPONSIVE TO ELECTRICAL ENERGY SUPPLIED DURING A WELDING OPERATION
Herbert D. Barnhart and Donald A. Stratton, North Syracuse, N.Y., assignors to General Electric Company, a corporation of New York
Filed Oct. 9, 1963, Ser. No. 314,933
8 Claims. (Cl. 219—110)

ABSTRACT OF THE DISCLOSURE

An electrical energy measuring apparatus for measurement of electrical energy supplied directly to a weld zone by a resistance welder. A Hall-effect device is electrically energized by the voltage drop across a weld zone through a pair of probes which are mounted in the welding electrodes and which have needle-points to penetrate the surfaces of the work pieces. The Hall-effect device is placed in a gap in a magnetizable ring which surrounds one of the electrodes such that it is traversed by magnetic flux having a magnitude proportional to the welding current. The output voltage of the Hall-effect device is therefore proportional to the power applied to the welding zone, and is integrated by an RC circuit to provide a voltage proportional to electrical energy applied to the weld zone.

---

This invention relates to apparatus responsive to electrical energy supplied during a welding operation and has particular relation to means for providing an accurate measurement of electrical energy supplied directly to a weld zone in work pieces during a welding operation.

In the field of resistance welding it is observed that variations in the surface resistance of work pieces to be welded result in substantial differences in the quality of the welds obtained when the same amount of electrical energy is supplied for each weld. This is explained by considering that the quality of a resistance weld is determined to a large extent by the amount of electrical energy supplied directly to the welding zone adjacent the interface of the work pieces, and that the energy so supplied varies in dependence upon the amount of electrical energy dissipated by the resistance at the outer surfaces of the work pieces engaged by the welding electrodes.

It is thus seen to be very desirable to provide apparatus which is responsive to the electrical energy supplied directly to the weld zone independent of the electrical energy dissipated by surface resistance of the work pieces. With such apparatus it is possible to detect welds formed by dissipation of energies in the weld zones having magnitudes which deviate from a predetermined desired energy magnitude.

It is therefore a primary object of the invention to provide novel and improved apparatus responsive to electrical energy supplied to a weld zone in work pieces during a welding operation.

It is another object of the invention to provide novel and improved apparatus of inexpensive and compact construction which provides an accurate indication of electrical energy supplied to a weld zone in work pieces during a welding operation.

It is a further object of the invention to provide novel and improved apparatus of inexpensive and compact construction including a Hall effect device for producing a visual indication of electrical energy supplied to a weld zone in work pieces during a welding operation.

In carrying out the invention in one form, the apparatus includes a pair of welding electrodes which are energizable for supplying current to work pieces to be associated therewith. First means is provided for producing a first electrical quantity which is substantially proportional to current supplied to the work pieces through the welding electrodes, and second means is provided for producing a second electrical quantity which is substantially proportional to the voltage drop across the weld zone only and independent of the voltage drop resulting from surface resistance of the work pieces. Product responsive means is connected to be responsive to the first and second electrical quantities for producing a first output quantity substantially proportional to the product of the first and second quantities. The apparatus further includes integrating means for integrating the first output quantity of the product responsive means to produce a second output quantity which is substantially proportional to the amount of electrical energy supplied to the weld zone. A vacuum tube voltmeter is connected for energization in accordance with the second output quantity to provide a visual indication of the amount of such energy.

Other objects and advantages of the invention will become apparent from the following description taken in conjunction with the accompanying drawings in which:

FIG. 1 is a schematic representation with parts in perspective showing the energy responsive apparatus of the present invention; and FIG. 2 is a schematic representation with parts in section showing in particular the means responsive to the voltage drop across the weld zone.

Referring now to the drawing, there is illustrated in FIG. 1 apparatus responsive to electrical energy supplied directly to a weld zone in work pieces to be welded and constructed in accordance with the present invention. The apparatus includes a pair of welding electrodes 10 and 11 of any suitable construction and in the illustrated embodiment, the electrodes are arranged in coaxial vertically spaced relation as viewed in FIG. 1 with their planar end faces 12 and 13 (FIG. 2) adapted for engagement with outer surfaces 14 and 15 of the work which consists of a pair of work pieces 16 and 17 disposed in overlapping relation between the electrodes.

In order to pass electric current through the work pieces 16 and 17 the welding electrodes 10 and 11 are connected for energization from a suitable current source, such as a welding transformer 18 of any suitable construction including a primary winding 19 adapted for energization from a voltage source (not shown) and a secondary winding 20 which is electrically connected to the electrodes 10 and 11. The primary winding 19 of the welding transformer 18 may be associated with suitable control circuitry (not shown) for controlling the wave shape and duration of the welding current supplied to the electrodes. The electrodes 10 and 11 are connected to mechanism (not shown) which effects movement of the electrodes relative to the work pieces and which maintains the electrodes in pressure engagement with the work pieces during the welding operation. When the transformer 18 is energized, current is passed through the electrodes 10 and 11, the work pieces 16 and 17 and the interface 21 of the work pieces with the result that heating and fusion of the material of the work pieces takes place within a weld zone 22 of comparatively high electrical resistance adjacent the interface 21 to provide a spot weld.

In a typical welding installation the operator presets the welder control so that a predetermined magnitude of welding current is supplied for a predetermined time interval to the work. Such presetting ordinarily is unchanged during a number of welding operations performed on work comprised of work pieces of the same type of material. It has been observed that the quality of welds obtained by such procedure differs to a substantial extent from work to work primarily as a result of variations in surface resistance of the work pieces. Such surface resistance results for example, from rust, foreign matter, scratches, etc., which are present in varying degrees on the exposed surfaces of the different work pieces. It can be appreciated that a portion of the electrical energy supplied to the work is dissipated by such surface resistance and that this portion varies from work to work so that the electrical energy supplied directly to the weld zone also varies from work to work. It is thus seen to be very desirable that provision be made for indicating and monitoring the amount of electrical energy supplied directly to the weld zone independent of the amount of energy dissipated by surface resistance. Such a monitoring arrangement permits the detection of welds formed by dissipation of energies in the weld zones having magnitudes which deviate from a predetermined desired energy magnitude.

In accord with the present invention apparatus for measuring and monitoring the electrical energy supplied directly to a weld zone is provided. Such apparatus includes first means represented generally by the numeral 23 for producing a first electrical quantity substantially proportional to electrical current supplied to the work through the welding electrodes, and also includes second means represented generally by the numeral 24 for producing a second electrical quantity substantially proportional to the voltage drop across the weld zone only and independent of the voltage drop resulting from surface resistance of the work. Additional means represented generally by the numeral 25 is responsive to the first and second electrical quantities to produce a first output quantity substantially proportional to the product of the first and second quantities, the first output quantity thus being proportional to power supplied to the weld zone. Means are provided to integrate the first output quantity to produce a second output quantity which is proportional to electrical energy supplied to the weld zone.

The means 25 may comprise any suitable device capable of producing an electrical quantity having a magnitude substantially proportional to the product of the magnitudes of two separate input quantities applied to the device. In the embodiment of the invention illustrated the means 25 is in the form of a Hall effect device of conventional construction and including a Hall plate 26 constructed of a suitable semiconductor material. The Hall plate 26 includes a pair of input terminals 27 spaced along a line in the plane of the plate and a pair of output terminals 28 spaced along an additional line in the plane of the plate which is perpendicular to the line containing the input terminals 27. Inasmuch as Hall effect devices are well known, details of their construction and operation are believed to be unnecessary. Suffice it to say that when the plate 26 is positioned in a magnetic field which traverses the plate along a path perpendicular to its plane, and when the terminals 27 are energized, an output voltage appears at the output terminals 28 having an average magnitude proportional to the product of the magnitude of the quantity energizing the input terminals 27 and the magnitude of the magnetic field. In the illustrated embodiment the plate 26 is subjected to a magnetic field developed by current traversing the welding electrodes, and the input terminals 27 are connected for energization in accordance with current proportional to the voltage drop across the weld zone 22.

In the illustrated embodiment of the invention the first means 23 for producing a magnetic flux having a magnitude proportional to current traversing the welding electrodes includes a magnetizable ring 29 formed of any suitable soft magnetic material and surrounding one of the electrodes 10 and 11. In FIG. 1 the ring 29 is shown as surrounding the electrode 11 so that a magnetic flux traverses the ring which is proportional to electrode current. The magnetic ring 29 is designed so that it does not saturate within the normal range of energization of the welding electrodes so that the magnitude of magnetic flux is a true representation of the magnitude of electrode current even for peak values of electrode current. The ring 29 is formed with an air gap 30 which extends radially of the ring and which is proportioned to receive the Hall plate 26 therein. The plate 26 may be mounted within the air gap 30 in any suitable manner. With the described arrangement magnetic flux in the ring 29 traverses the plate 26 along a path which is generally perpendicular to the plane of the plate.

In the illustrated embodiment the second means 24 which produces a current proportional to the voltage drop across the weld zone includes a pair of electroconductive needle point probes 31 and 32 associated respectively with the electrodes 10 and 11 and arranged to penetrate the outer surfaces 14 and 15 of the work pieces during a welding operation. The probes 31 and 32 and their manner of association with the electrodes are identical and for this reason only the probe 31 and its manner of association with the electrode 10 will be described in detail.

As illustrated in FIG. 2, the probe 31 is received within a passage 33 formed centrally of the electrode 10 and opening at the end face 12 thereof. The probe 31 and its associated passage 33 may be of any desired configuration such as circular in transverse cross section. The probe 31 is electrically insulated from the electrode 10 and for this purpose fits within the opening of an insulating tube 34 pressed within the passage 33. Preferably, the probe 31 is biased outwardly of the passage 33 by means of a spring 35 having ends secured respectively to the base of the probe and to the base of the insulating tube 34 to mount the probe in operative position. The spring 35 is selected to be sufficiently stiff so that the probe 31 extends beyond the face 12 of electrode 10 to penetrate the surface 14 of the work piece 16 when the face 12 of electrode 10 engages the surface 14 of work piece 16, and is sufficiently weak to permit a small inward displacement of the probe relative to the electrode as the electrode is brought into engagement with the work piece. Insulated wires 36 and 37 are electrically connected to the probes and extend to the terminals 27 through small passages 41 formed in the electrodes and communicating with the interior of the tubes 34 through openings in the bases of the tubes.

In operation, when the electrodes 10 and 11 are brought into pressure engagement with the outer surfaces of the work pieces, the probes 31 and 32 break through the surfaces 14 and 15 of the work pieces to penetrate the material thereof to areas adjacent to and across the weld zone 22 as illustrated in FIGURE 1. When the transformer 18 is energized, welding current traverses the electrodes and the work pieces to effect a resistance weld, and such welding current establishes a magnetic flux in the ring 29 which traverses the Hall plate 26 within the air gap 30, the magnetic flux having a magnitude substantially proportional to the magnitude of the welding current. At the same time, a current produced in response to generation of a voltage drop across the weld zone 22 traverses the probes 31 and 32, such voltage drop being established by the welding current passing through the resistance of the work piece material in the welding zone. The current carried by probes 31 and 32 is applied to the input terminals 27 through the wires 36 and 37 and is substantially proportional to the voltage drop across the welding zone, the current being independent of the voltage drop resulting from surface resistance at the surfaces 14 and 15 of the work pieces. When the plate 26 is energized in the manner above described, an output voltage appears at the output terminals 28 which is a direct current voltage having a magnitude substantially proportional to the product of the magnitudes of the magnetic flux traversing the plate 26 and the current applied to terminals 27 thereof. The output voltage is therefore substantially proportional to the power applied to the welding zone.

In order to provide a quantity representative of the electrical energy supplied to the welding zone, the voltage appearing across terminals 28 is applied to a suitable integrating circuit comprised of a resistor 38 having one terminal connected to one of the output terminals 28, and a capacitor 39 having one terminal connected to the other terminal of resistor 38 and having a second terminal connected to the remaining terminal 28. The voltage appearing across capacitor 39 is thus substantially proportional to the time integral of the voltage across terminals 28 or to energy supplied to the welding zone. In the present invention the voltage across capacitor 39 is applied to a measuring instrument 40 which is preferably a high impedance input, direct current vacuum tube voltmeter which provides a visual indication of the magnitude of the voltage input thereto. Conveniently, the scale of the voltmeter 40 may be calibrated in terms of electrical energy. Excellent results have been obtained by employing a resistor 38 having a resistance of the order of six hundred thousand ohms, and by utilizing a capacitor 39 with a capacity of approximately one microfarad.

Inasmuch as the electrical energy required to be supplied to a welding zone to provide a high quality weld can be readily ascertained, the present invention permits an operator to quickly determine whether or not a high quality weld has been successfully performed. The energy measuring device of the present invention is of very inexpensive and compact construction including readily available parts which may be incorporated into present day welding equipment.

While we have shown and described a particular embodiment of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. In apparatus responsive to electrical energy supplied to a weld zone in work during a welding operation, a pair of welding electrodes energizable for supplying current to work to be associated therewith, first means for producing a first electrical quantity substantially proportional to current supplied to said work through said electrodes, second means for producing a second electrical quantity substantially proportional to the voltage drop across the weld zone only, said second means including separate probes associated with each electrode which penetrate the surfaces of the work to areas adjacent to and across the weld zone such that the second electrical quantity is produced independently of the voltage drop resulting from surface resistance of the work, means responsive to said first and second electrical quantities for producing a first output quantity substantially proportional to the product of said first and second quantities, and means for integrating said first output quantity to produce a second output quantity which is substantially proportional to electrical energy supplied to the weld zone.

2. In apparatus responsive to electrical energy supplied to a weld zone in work during a welding operation, a pair of welding electrodes energizable for supplying current to work to be associated therewith, first means for producing a first electrical quantity substantially proportional to current supplied to said work through said electrodes, second means for producing a second electrical quantity substantially proportional to the voltage drop across the weld zone only, said second means including separate probes associated with each electrode which penetrate the surfaces of the work to areas adjacent to and across the weld zone such that the second electrical quantity is produced independently of the voltage drop resulting from surface resistance of the work, means responsive to said first and second electrical quantities for producing a first output quantity substantially proportional to the product of said first and second quantities, means for integrating said first output quantity to produce a second output quantity which is substantially proportional to electrical energy supplied to the weld zone, and a vacuum tube voltmeter connected for energization in accordance with said second output quantity.

3. In apparatus responsive to electrical energy supplied to a weld zone in work during a welding operation, a pair of welding electrodes energizable for supplying current to work to be associated therewith, means for producing a magnetic flux substantially proportional to current supplied to said work through said electrodes, means for producing a resultant current substantially proportional to the voltage drop across the weld zone only, said means for producing a resultant current including separate probes associated with each electrode which penetrate the surfaces of the work to areas adjacent to and across the weld zone such that the resultant current is produced independently of the voltage drop resulting from surface resistance of the work, a Hall effect device including a Hall plate having input and output terminals generally in the plane of the plate, said plate having its input terminals connected for energization by said resultant current and being arranged such that said magnetic flux traverses said plate along a path generally perpendicular to its plane, said Hall device producing when so energized an output voltage at said output terminals substantially proportional to the product of said resultant current and said magnetic flux, means for integrating said output voltage to produce an output quantity which is substantially proportional to electrical energy supplied to the weld zone, and a vacuum tube voltmeter connected for energization in accordance with said output quantity.

4. In apparatus responsive to electrical energy supplied to a weld zone in work during a welding operation, a pair of welding electrodes energizable for supplying current to work to be associated therewith, means for producing a magnetic flux substantially proportional to current supplied to said work through said electrodes, a separate conductive needle point probe associated with each electrode and insulated therefrom, said probes being arranged to penetrate the work to areas adjacent to and across the weld zone during a welding operation, a Hall effect device including a Hall plate having input and output terminals generally in the plane of the plate, said plate having its input terminals electrically connected to said probes for energization by a resultant current substantially proportional to the voltage drop across the weld zone only and independent of the voltage drop resulting from surface resistance of the work, said Hall plate being arranged such that said magnetic flux traverses said plate along a path generally perpendicular to its plane, said Hall device producing when so energized an output voltage at said output terminals substantially proportional to the product of said resultant current and said magnetic flux, and means for integrating said output voltage to produce an output quantity which is substantially proportional to electrical energy supplied to the weld zone.

5. In apparatus responsive to electrical energy supplied to a weld zone in work during a welding operation, a pair of welding electrodes energizable for supplying current to work to be associated therewith, a magnetizable ring surrounding one of said electrodes and having an air gap, said ring being designed so that it is unsaturated when traversed by a magnetic flux which is proportional to current flow through said electrodes within the normal range of energization of said electrodes, a separate conductive needle point probe associated with each electrode and insulated therefrom, said probes being arranged to penetrate the work to areas adjacent to and across the weld zone during a welding operation, a Hall effect device including a Hall plate having input and output terminals generally in the plane of the plate, said input terminals being electrically connected to said probes to be energized by an electrical quantity substantially proportional to the voltage drop across the weld zone only and independent of the voltage drop resulting from surface resistance of the work, said plate being positioned in said air gap such that said magnetic flux which is substantially proportional to current flow through said electrodes traverses said plate along a path generally perpendicular to its plane, and an integrating circuit connected to the output terminals of the plate to produce an output quantity which is substantially proportional to electrical energy supplied to the weld zone.

6. In apparatus responsive to electrical energy supplied to a weld zone in work during a welding operation, a pair of welding electrodes energizable for supplying current to work to be associated therewith, a magnetizable ring surrounding one of said electrodes and having an air gap, said ring being designed so that it is unsaturated when traversed by a magnetic flux which is proportional to current flow through said electrodes within the normal range of energization of said electrodes, a separate conductive needle point probe associated with each electrode and insulated therefrom, said probes being arranged to penetrate the work to areas adjacent to and across the weld zone during a welding operation, a Hall effect device including a Hall plate having input and output terminals generally in the plane of the plate, said input terminals being electrically connected to said probes to be energized by an electrical quantity substantially proportional to the voltage drop across the weld zone only and independent of the voltage drop resulting from surface resistance of the work, said plate being positioned in said air gap such that said magnetic flux which is substantially proportional to current flow through said electrodes traverses said plate along a path generally perpendicular to its plane, an integrating circuit connected to the output terminals of the plate to produce an output quantity which is substantially proportional to electrical energy supplied to the weld zone, and a vacuum tube voltmeter connected for energization in accordance with said output quantity.

7. In apparatus responsive to electrical energy supplied to a weld zone in work during a welding operation, a pair of welding electrodes energizable for supplying current to work to be associated therewith, a magnetizable ring surrounding one of said electrodes and having an air gap, said ring being designed so that it is unsaturated when traversed by a magnetic flux which is proportional to current flow through said electrodes within the normal range of energization of said electrodes, each electrode having a passage opening at its work engaging face, insulation lining each of said passages, a separate conductive needle point probe within each of said passages, resilient means biasing each of said probes outwardly of said passages, said probes being positioned and biased so as to penetrate the work to areas adjacent to and across the weld zone during a welding operation, a Hall effect device including a Hall plate having input and output terminals generally in the plane of the plate, said input terminals being electrically connected to said probes to be energized by an electrical quantity substantially proportional to the voltage drop across the weld zone only and independent of the voltage drop resulting from surface resistance of the work, said plate being positioned in said air gap such that said magnetic flux which is substantially proportional to current flow through said electrodes traverses said plate along a path generally perpendicular to its plane, and an integrating circuit connected to the output terminals of the plate to produce an output quantity which is substantially proportional to electrical energy supplied to the weld zone.

8. In apparatus responsive to electrical energy supplied to a weld zone in work during a welding operation, a pair of welding electrodes energizable for supplying current to work to be associated therewith, a magnetizable ring surrounding one of said electrodes and having an air gap, said ring being designed so that it is unsaturated when traversed by a magnetic flux which is proportional to current flow through said electrodes within the normal range of energization of said electrodes, each electrode having a passage opening at its work engaging face, insulation lining each of said passages, a separate conductive needle point probe within each of said passages, resilient means biasing each of said probes outwardly of said passages, said probes being positioned and biased so as to penetrate the work to areas adjacent to and across the weld zone during a welding operation, a Hall effect device including a Hall plate having input and output terminals generally in the plane of the plate, said input terminals being electrically connected to said probes to be energized by an electrical quantity substantially proportional to the voltage drop across the weld zone only and independent of the voltage drop resulting from surface resistance of the work, said plate being positioned in said air gap such that said magnetic flux which is substantially proportional to current flow through said electrodes traverses said plate along a path generally perpendicular to its plane, an integrating circuit connected to the output terminals of the plate to produce an output quantity which is substantially proportional to electrical energy supplied to the weld zone, said integrating circuit comprising a resistor-capacitor network, and a vacuum tube voltmeter connected across said capacitor for energization in accordance with said output quantity.

References Cited

UNITED STATES PATENTS

| | | | |
|---|---|---|---|
| 2,370,009 | 2/1945 | Clark et al. | 219—110 |
| 3,194,939 | 7/1965 | Hill | 219—110 X |
| 3,209,060 | 9/1965 | Borrebach | 314—68 X |
| 3,240,961 | 3/1966 | Noth | 219—110 X |

OTHER REFERENCES

"Welder Control Circuit," by H. R. Gates in the "I.B.M. Technical Disclosure Bulletin," vol. 4, No. 9, February 1962.

RICHARD M. WOOD, *Primary Examiner.*

B. A. STEIN, *Assistant Examiner.*